United States Patent [19]

Moretto et al.

[11] 4,073,801
[45] Feb. 14, 1978

[54] PROCESS FOR THE PREPARATION OF LINEAR AND BRANCHED CHLOROSILOXANES

[75] Inventors: Hans-Heinrich Moretto; Armand de Montigny, both of Leverkusen; Karl-Friedrich Thom; Reinhard Schliebs, both of Cologne, all of Germany

[73] Assignee: Bayer Aktiengesellschaft, Leverkusen, Germany

[21] Appl. No.: 627,302

[22] Filed: Oct. 30, 1975

[30] Foreign Application Priority Data

Nov. 12, 1974 Germany .............................. 2453482

[51] Int. Cl.² ................................................ C07F 7/08
[52] U.S. Cl. ............................................. 260/448.2 E
[58] Field of Search .................................. 260/448.2 E

[56] References Cited

U.S. PATENT DOCUMENTS 2,421,653  6/1947  Sauer ............................ 260/448.2 E
3,642,851  2/1972  Bennett ...................... 260/448.2 E X
3,646,090  2/1972  Bennett ......................... 260/448.2 E

OTHER PUBLICATIONS

Noll, "Chemistry and Technology of Silicones", Academic Press, N. Y. (1968), pp. 220 and 221.

*Primary Examiner*—Paul F. Shaver
*Attorney, Agent, or Firm*—Burgess, Dinklage & Sprung

[57] ABSTRACT

A chlorosilane or partial hydrolysis product thereof is reacted with a siloxane and stable polymeric products of comparatively high molecular weight or high chlorine content are produced by effecting the reaction in the presence of a siloxane protonic acid equilibration catalyst in combination with a hydrogen halide acid. The hydrogen halide acid may be produced in situ. Representative protic acid equilibration catalysts include sulfuric acid, oleum, polysulfuric acids, sulfonic acids including aromatic, alkyl and perfluoroalkyl sulfonic acids, and polysulfonic acids.

6 Claims, No Drawings

PROCESS FOR THE PREPARATION OF LINEAR AND BRANCHED CHLOROSILOXANES

The present invention relates to the preparation of linear or branched chlorosiloxanes by reaction of chlorosilanes or chlorosiloxanes with cyclic, linear or branched siloxanes which optionally possess silicon-functional or organo-functional groups (compare, for example, W. Noll, Chemie und Technologie der Silicone (Chemistry and Technology of the Silicones), Verlag Chemie, 2nd edition, 1968), in the presence of a combination of catalytic amounts of a protic acid equilibration catalyst for siloxanes and a hydrogen halide acid.

Linear and branched organopolysiloxanes with terminal Si-bonded chlorine atoms are starting materials for a plurality of organopolysiloxane-containing materials, since they lend themselves to reaction with reactive hydrogen atoms, such as ..., for example, of alcohols, amines and many other compounds. Thus they serve, inter alia, for the preparation of polyether-polysiloxane copolymers which, as a result of their surface-active properties, have found extensive industrial use, for example as stabilizers in the production of polyurethane foam, and for the preparation of other block copolymers.

The preparation of organopolysiloxanes containing chlorine has hitherto been carried out either by incomplete hydrolysis of the organochlorosilanes (compare, for example, U.S. Pat. No. 2,381,366 and DT-AS (German published specification N0.) 1,174,509) or by reaction of chlorosilanes with, above all, cyclic siloxanes in the presence of catalysts such as, for example, $FeCl_3$ and/or HCl (U.S. Pat. No. 2,421,653) or phosphine oxides (U.S. Pat. No. 3,162,662). Quaternary ammonium salts are also used for the ring opening of cyclotrisiloxanes in the presence of chlorosilanes, in order to obtain chlorosiloxanes (U.S. Pat. No. 3,162,662).

The hydrolytic processes however, suffer from disadvantages in principle. The addition of the water, required for the hydrolysis, to the chlorosilanes cannot be effected as rapidly as desired, so that long reaction times result. Furthermore, the hydrochloric acid evolved as a gas additionally entrains a part of the as yet unreacted chlorosilanes and thus causes losses and difficulties in the reproducibility of the desired products. Necessarily, technically complex installations are also required for condensing at least a part of the silanes which escape. Most processes in addition also use solvents which are expensive and present a fire hazard.

In the reactions of chlorosilanes with organosiloxanes, principally cyclic siloxanes, which have hitherto been disclosed, only oligomeric chlorosiloxanes with a maximum of 10 siloxy units are described. In the processes which employ phosphine oxides or quaternary ammonium salts as catalysts, the catalyst is admittedly able to open the cyclic siloxanes and cause addition reaction of the chlorosilane but proves unable to equilibrate the siloxane bond in the chlorosiloxanes produced. The chain length or molecular weight of the chlorosiloxanes is thus virtually predetermined by the size of the ring of the cyclic siloxane.

Further disadvantages to be mentioned are above all the long reaction times and, in some cases, the fact that solvents are used.

While equilibrating effects are ascribed to hydrogen halide acids, Comparison Example I, hereinbelow shows that hydrogen chloride is not capable of catalyzing the preparation of an equilibrated chlorosiloxane. The equilibrating synthesis of higher-molecular siloxanes does not occur.

The use of Lewis acids such as iron-(III) chloride or iron-(III) chloride hexahydrate — with or without hydrogen chloride — as described in U.S. Pat. No. 2,381,366 also does not give satisfactorily equilibrated chlorosiloxanes under the conditions according to the invention (Comparison Example II and III).

The use of Lewis acids, above all iron-(III) chloride, shows considerable disadvantages. One of the reasons why this catalyst is only suitable for the preparation of distillable chlorosiloxanes is that the reaction mixtures have a deep, dark color due to the dissolved $FeCl_3$ and are therefore unsuitable for many applications. An economically acceptable removal or deactivation of this catalyst is difficult, but absolutely essential. The presence of $FeCl_3$ does not permit freeing higher-molecular products from undesired low-molecular, above all cyclic, siloxane constituents in the usual manner by heating (distillation, or distilling off). The iron-(III) chloride present re-forms these low-molecular constituents, in accordance with the equilibrium, during the heating process and during the subsequent storage of the products (Comparison Example III). The known protic acid equilibration catalysts for siloxanes also do not display their equilibrating action, or do not display it reproducibly, in the reaction between chlorosilanes and siloxanes.

Comparison Example IV shows that even the use of the most rapid known protic acid equilibration catalysts for siloxanes, namely perfluoroalkanesulfonic acids, does not lead to equilibrated chlorosiloxanes.

It has now been found, surprisingly, that by using a combination of a protic acid equilibration catalyst for siloxanes and hydrogen halides, the preparation of linear and branched equilibrated chlorosiloxanes by reaction of chlorosilanes or their partial hydrolysis products with organosiloxanes of any desired structure is possible in high yields and with short reaction times.

Accordingly, the subject of the present invention is a process for the preparation of linear and branched equilibrated organopolysiloxanes containing chlorine by reaction of one or more chlorosilanes

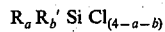

or partial hydrolysis products thereof, wherein
  $a = 0, 1, 2$ or 3 and
  $b = 0, 1, 2$ or 3 and
  $a + b \leq 3$,
with one or more organosiloxanes which can contain the following structural units in optionally alternating arrangement

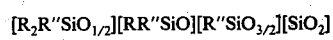

wherein
  R and R' are hydrogen or an aliphatic, aromatic, saturated or unsaturated, optionally halogensubstituted or cyano-substituted, monovalent hydrocarbon radical with up to 18 C atoms and R" is chlorine or hydroxyl or has the meaning indicated for R and R',
in such ratios that the number of all Si—Cl groups always exceeds the number of all Si—OH groups, characterized in that the reaction is carried out in the presence of a combination of a protic acid equilibration catalyst for siloxanes, which is in itself known and a hydrogen halide, preferably hydrogen chloride, at temperatures between about −10° and 200° C, optionally under pressure. Each catalyst component is desirably present in about 0.1 to 3% by weight of the total reactants.

The choice of the catalyst depends on the desired reaction conditions and properties of the reaction products. The use of perfluoroalkanesulfonic acids $$R_F SO_3 H$$

wherein $R_F$ is a perfluorinated alkyl radical with up to 10 C atoms, in amounts of about 0.01 to 1% by weight, preferably about 0.05 to 0.3% by weight, permits the preparation of organopolysiloxanes containing chlorine even at room temperature. However, this reaction is preferably carried out at temperatures of about 50°–150° C under pressure (about 1–4 atmospheres gauge) since in that case, for example, linear chlorosiloxanes with up to 500 siloxy units can be produced already in less than 1 hour's reaction time (at 100° C). Possible starting materials for this reaction, as with all catalysts mentioned in the text which follows, are above all trimethylchlorosilane, dimethylvinylchlorosilane, dimethylhydrogenochlorosilane, dimethylphenylchlorosilane, chloropropyldimethylchlorosilane, chloromethyldimethylchlorosilane, bromomethyldimethylchlorosilane, dimethyldichlorosilane, methylvinyldichlorosilane, methylhydrogenodichlorosilane, methylphenyldichlorosilane, 3,3,3-trifluoropropylmethyldichlorosilane, diphenyldichlorosilane, chloropropylmethyldichlorosilane, chloromethylmethyldichlorosilane, bromomethylmethyldichlorosilane, methyltrichlorosilane, chloromethyltrichlorosilane, vinyltrichlorosilane, phenyltrichlorosilane, silicochloroform and silicon tetrachloride.

Suitable siloxanes are, preferably, the direct hydrolysis products of dimethyldichlorosilane, as produced on a large industrial scale as intermediates for the production of the cyclosiloxanes, as well as the cyclosiloxanes $$(R\ R'\ SiO)_n$$

wherein $n = 3$ to 5 and

R and R' have the meaning already mentioned.

It is also possible to use, above all, any desired linear and branched siloxanes, the preparation of which is familiar to those skilled in the art. These siloxanes can also contain silicon-functional groups such as Si—H, Si—OH or Si—Cl or organo-functional groups such as Si-vinyl, —Si—CH$_2$Cl and the like, since the reaction conditions can be so adapted, between about −10° and 200° C, that even sensitive functional groups remains preserved.

In addition to the category of the perfluoroalkanesulfonic acids already mentioned, a large number of protic acids can be used as catalysts. These preferentially include sulfuric acid, oleum and polysulfuric acids, phosphoric acid, polyphosphoric acids up to P$_4$O$_{10}$ and acid ion exchangers suchas, for example, acid-activated bleaching earths. The choice depends on the problem to be solved. Thus, for example, the use of sulfuric acid, which is preferably added in amounts of about 0.05 to 0.5% by weight, is more economical than the use of a perfluoroalkanesulfonic acid. However, sulfuric acid is not equally suitable for carrying out the reaction at temperatures below about 50° C. The use of an acid-activated bleaching earth, which is preferably added in amounts of about 0.3 to 3% by weight, permits, for example, the removal of the catalyst by simple filtration. The active acid can, of course, also be produced "in situ", and equally it is also possible to employ, for example, acid-forming substances such as, for example, anhydrides.

The equilibration reaction stops immediately after removal of the hydrogen halide, for example by application of vacuum, and thus permits the problem-free removal of low-molecular constituents by a heating process. In addition, it is of course also possible to deactivate the protic acids themselves by forming a salt, for example with tertiary amines.

As already mentioned the process can also be carried out, not with the chlorosilanes, but with their partial hydrolysis products, that is to say chlorosiloxanes, or mixtures of chlorosilanes and siloxanes. The process thus also embraces the equilibration of chlorosiloxanes with organosiloxanes, and of chlorosiloxanes with one another.

The hydrogen halide required for the process, preferably hydrogen chloride, can be added in diverse ways. Gaseous hydrogen halide can be passed into the reaction mixture or be forced into the reaction vessel until the desired pressure is reached.

A further possibility is to produce the hydrogen halide "in situ" by reaction of a halogenosilane, added in appropriate excess, with water or with siloxanes containing Si—OH. Further possible reactants are one or more protic acids. However, the last-mentioned possibility is not preferred, since it requires unnecessarily large amounts of catalyst, which detracts from the economy of the process and leads to unnecessarily high salt contents on neutralization.

The amount of hydrogen halide added is preferably about 0.1–1% by weight. If the process is carried out at atmospheric pressure, the hydrogen halide is in most cases passed in until saturation is reached. When the process is carried out under pressure, the amount of hydrogen halide added or produced in situ depends on the preferred pressure of about 0.5–6 atmospheres gauge, which in turn is influenced by the reaction temperature and the level to which the reaction vessel is filled. The amount of hydrogen halide added affects the rate of reaction but larger amounts than the preferred 0.1–1% by weight hardly produce additional advantages in respect of shortening the reaction times. It is a prerequisite that in carrying out the process under pressure the necessary excess pressure of about 0.5 to 6 atmospheres gauge, responsible for the hydrogen halide being present in the liquid reaction phase, should be reached.

Because of the short reaction times which are achievable, the process can also be operated continuously.

The examples given are intended to explain the present invention yet further (% data relate to % by weight, unless noted otherwise).

COMPARISON EXAMPLE I 1,815 g (6.13 moles) of octamethylcyclotetrasiloxane and 129 g (1 mole) of dimethyldichlorosilane are heated in the presence of 18 g (½ mole) of hydrogen chloride at 2 atmospheres gauge to 100° C for 2 hours. The colorless reaction product has a viscosity of 2.65 cp at 20° C. After removal of the dissolved hydrogen chloride, the product can largely be distilled in vacuo. Analysis by gas chromatography shows that the main constituents are 35.5% of octamethylcyclotetrasiloxane, 7.55% of decamethylcyclopentasiloxane and α,ω-chlorosiloxanes ClMe$_2$Si—O—(SiMe$_2$O—)$_n$SiMe$_2$Cl $n = 1$: 1.65%; $n = 2$: 5.60%; $n = 3$: 3.65%; $n = 4$: 5.75%; $n = 5$: 5.20%; $n = 6$: 5.80%; $n = 7$: 5.35%; $n = 8$: 5.00%; $n = 9$: 4.8%.

Distillation at up to 100°/2 mm Hg sump temperature/pressure gave 1,680 g of distillate containing 1.45% by weight of Cl and 237 g of residue containing 11.2% by weight of Cl. Comparison Example II:

1,815 g (6.13 moles) of octamethylcyclotetrasiloxane and 129 g (1 mole) of dimethyldichlorosilane are heated in the presence of 9.6 g (0.5% by weight) of FeCl$_3$ (anhydrous) and 18 g (= 0.5 mole≙1% by weight) of hydrogen chloride for 2 hours at 100° C in a closed enamelled reaction vessel. In the course thereof the pressure rises to 2.45 atmospheres gauge. After removing the dissolved hydrogen chloride, the opaque black reaction product has a viscosity of 30 cp at 20° C. On heating the product in vacuo at up to 120°/1 mm Hg, 206.5 g of distillate containing 7.81% by weight of Cl are obtained. Two further heat treatments again give 130 g of distillate containing 6.56% by weight of Cl, and 254 g containing 6.58% by weight of Cl, respectively. The residue which remains contains 3.17% by weight of Cl. Comparison Example III:

1,815 g (6.13 moles) of octamethylcyclotetrasiloxane and 129 g (1 mole) of dimethyldichlorosilane are stirred in the presence of 9.6 g (~0.5% by weight) of FeCl$_3$ (anhydrous) for 2 hours at 100° C under a nitrogen atmosphere. The opaque black reaction product has a viscosity of 28 cp at 20° C. On heating the product at up to 120° C in a vacuum of 1 mm Hg, 343 g of distillable constituents and 1,608 g of residue are obtained. After storing the residue for 12 hours at room temperature, a further 620 g of distillate can be obtained under the same heating conditions. The residue diminishes to 980 g containing 2.25% by weight of Cl. The combined distillates have a chlorine content of 4.25% by weight.

COMPARISON EXAMPLE IV 1,815 g (6.13 moles) of octamethylcyclotetrasiloxane and 129 g (1 mole) of dimethyldichlorosilane are heated in the presence of 2 g (~0.1% by weight) of perfluorobutanesulfonic acid to 100° C for 2 hours at 1 atmosphere gauge pressure in an enamelled closed reaction vessel. The colorless reaction product has a viscosity of 7.4 cp at 20° C. It can largely be distilled in vacuo. Analysis by gas chromatography shows, as the main constituents, 3.85% of dimethyldichlorosilane, 87.8% of octamethylcyclotetrasiloxane and α,ω-chlorosiloxanes ClMe$_2$Si—O—(SiMe$_2$O)$_n$SiMe$_2$Cl $n = 0$: 0.75%; $n = 1$: 1.15%; $n = 2$: 1.05%; $n = 3$: 0.80%; $n = 4$: 0.75%; $n = 5$: 0.60%.

Result of the distillation: 1,617 g of distillate containing 3.85% by weight of Cl and 274 g of residue containing 1.48% by weight of Cl, after distillation at up to 100°/2 mm Hg sump temperature/pressure.

EXAMPLE 1

161 g (1.25 moles) of dimethyldichlorosilane and 2 g of perfluorobutanesulfonic acid (≙0.1% by weight), as well as 4.5 g (0.25 mole) of water — for the purpose of producing 18 g (0.5 mole≙1% by weight) of hydrogen chloride — are added to 1,815 g (6.13 moles) of octamethylcyclotetrasiloxane. The reaction mixture is stirred in an enamelled 4 l vessel for 1 hour at 100° and 2.3 atmospheres gauge. After removing the excess hydrochloric acid in a water pump vacuum, the colorless reaction product has a viscosity of 35 cp at 20° C. It is heated at up to 120° C sump temperature under 0.6 mm Hg, whereupon 146 g of distillate (≙ 8% by weight) pass over. 1,671 g of residue containing 2.77% by weight of Cl and having a viscosity of 42 cp at 20° C remain. Example 2:

6.45 g (0.05 mole) of dimethyldichlorosilane and 0.31 g (≙0.14% by weight) of perfluorobutanesulfonic acid are added to 222 g (0.75 mole) of octamethylcyclotetrasiloxane and the mixture is stirred for 1 hour. In the course thereof, the viscosity of the reaction mixture rises to about 200 cp at 20° C. Hydrogen chloride gas is then passed in for 30 minutes and the reaction mixture is left for 12 hours. The water-clear product, freed from the dissolved hydrogen chloride in a water pump vacuum at about 40° C, has a viscosity of 74 cp at 20° C and a chlorine content of 1.52% by weight.

EXAMPLE 3

2.58 g (0.02 mole) of dimethyldichlorosilane and 0.31 (≙0.14% by weight) of perfluorobutanesulfonic acid are added to 222 g (0.75 mole) of octamethylcyclotetrasiloxane and the mixture is stirred for 1 hour. In the course thereof, the viscosity of the reaction mixture rises to about 400 cp at 20° C. Hydrogen chloride gas is then passed in for 30 minutes and the reaction mixture is left for 12 hours. The water-clear product, freed from the dissolved hydrogen chloride in a water pump vacuum at about 40° C, has a viscosity of 282 cp at 20° C and a chlorine content of 0.63% by weight.

EXAMPLE 4

112.1 g (0.81 mole) of methyltrichlorosilane and 5 g (~0.7% by weight) of perfluorobutanesulfonic acid are added to 703 g (2.38 moles) of octamethylcyclotetrasiloxane. Hydrogen chloride gas is passed into this mixture for about 30 minutes. The reaction mixture is then left for 18 hours. The product freed from the dissolved hydrogen chloride in a water pump vacuum at about 40° C is water-clear and has a chlorine content of 5.48% by weight.

EXAMPLE 5

A mixture of 2,000 g (6.75 moles) of octamethylcyclotetrasiloxane, 210 g (0.61 mole) of tetravinyltetramethylcyclotetrasiloxane, 100 g (0.775 mole) of dimethyldichlorosilane, 2.3 g of perfluorobutanesulfonic acid and 4.5 g (0.25 mole) of water — for the purpose of producing 18 g (0.5 mole) ≙ 1% by weight of hydrogen chloride — is heated in an enamelled reaction vessel of 4 l capacity for 2 hours to 100° C at 1.9 atmospheres gauge. The colorless reaction product is freed from the hydrogen chloride in a water pump vacuum and is subsequently heated at up to 120° C sump temperature at 2 mm Hg. 151 g ≙ 7% by weight of distillate and 2,088 g of residue (product) having a chlorine content of 1.67% by weight and a vinyl content of 1.51 mmoles of vinyl/g, and a viscosity of 87.3 cp at 20° C, are produced.

EXAMPLE 6

677 g (5.25 moles) dimethyldichlorosilane and 2.8 g (≙0.1% by weight) of perfluorobutanesulfonic acid are added to 1,850 g (≙ 25 moles of Me$_2$SiO) of polydimethylsiloxane containing 1.15% by weight of Si-OH and having a viscosity of 7 cp at 20° C. The mixture is introduced into an enamelled laboratory autoclave of 4 l capacity and mixed with 4.5 g (0.25 mole) of water in order to produce 18 g (≅1% by weight) of hydrogen chloride. The reaction mixture is stirred for 2 hours at 100° C and 2.8 atmospheres gauge. The product, freed from the dissolved hydrogen chloride in a water pump vacuum at 40° C, is water-clear and has a chlorine content of 13.01% by weight.

EXAMPLE 7

1,732 g (≅23.5 moles of $Me_2SiO$) of polydimethylsiloxane containing 1.15% by weight of Si-OH and having a viscosity of 7 cp at 20° C are mixed with 294 g (1.96 moles) of methyltrichlorosilane and 2.0 g (≅0.1% by weight) of perfluorobutanesulfonic acid. The compounds are then transferred into an enamelled laboratory autoclave of 4 l capacity, 4.5 g (0.25 moles) of water are added in order to produce 18 g (1% by weight) of hydrogen chloride, and the mixture is stirred for 2 hours at 100° C and 3.1 atmospheres gauge. The product, freed from the dissolved hydrogen chloride in a water pump vacuum at 40° C, has a chlorine content of 8.31% by weight. On heating at up to 120° C sump temperature under 1 mm Hg, 215 g (≅ 12%) of distillate containing 15.1% by weight of Cl and 1,602 g of residue (product) containing 7.29% by weight of Cl are obtained.

EXAMPLE 8

330 g (2.2 moles) of methyltrichlorosilane and 8 g (≅0.25% by weight) of perfluorobutanesulfonic acid are added to 2,920 g (39.5 moles of $Me_2SiO$) of polydimethylsiloxane containing 1.15% by weight of Si—OH and having a viscosity of 7 cp at 20° C. The reaction mixture is stirred in an enamelled laboratory autoclave of 4 l capacity for 1 hour at 100° C and 3 atmospheres gauge. The hydrochloric acid required for the reaction is produced by the reaction of the Si-OH content of the polydimethylsiloxane with the chlorosilane. After removing the dissolved hydrogen chloride in a water pump vacuum at 40° C, the reaction product has a chlorine value of 5.8% by weight. On heating at up to 120° C sump temperature, 253 g of distillate (8% by weight) containing 3.98% by weight of chlorine and 2,906 g of residue (product) containing 5.6% by weight of Cl are obtained.

EXAMPLE 9

54 g (0.5 mole) of trimethylchlorosilane, 32 g (0.25 mole) of dimethyldichlorosilane (representing an excess, in order to produce hydrogen halide with the water added), 2.3 g (≅0.1% by weight) of perfluorobutanesulfonic acid and 4.5 g (0.25 mole) of $H_2O$ are added to 2,220 g (7.5 moles) of octamethylcyclotetrasiloxane. This reaction mixture is stirred in an enamelled laboratory autoclave of 4 l capacity for 1 hour at 100° C and 2.4 atmospheres gauge. After removing the dissolved hydrogen chloride in a water pump vacuum at 40° C, the water-clear product has a viscosity of 70 cp at 20° C and a chlorine content of 0.81% by weight.

EXAMPLE 10

420 g (3.25 moles) of dimethyldichlorosilane, 8 g (≅0.4% by weight) of perfluorobutanesulfonic acid and 4.5 g (0.25 mole) of water are added to 1,550 g of a silicone oil with trimethylsilyl end groups and containing 27 mole % of diphenylsiloxy units, 41.4 mole % dimethylsiloxy units and 31.6 mole % of trimethylsiloxy units, and having a viscosity of 300 cp at 20° C. The reaction mixture is stirred in an enamelled laboratory autoclave of 4 l capacity for 3 hours at 100° C and 2.6 atmospheres gauge. After removing the dissolved hydrogen chloride in a water pump vacuum at 40° C, the reaction product is heated up. Heating at up to 120° sump temperature under 2 mm Hg gives 316 g of distillate (15.5%) and 1,596 g of residue containing 8.03% by weight of Cl. According to the $^1$H-NMR spectrum, the residue has a ratio of Si-bonded $C_6H_5$— groups to Si-bonded $CH_3$- groups of 1:3.48.

EXAMPLE 11

1,850 g (≅ 25 moles of $Me_2SiO$) of polydimethylsiloxane containing 1.15% by weight of SiOH and having a viscosity of 7 cp at 20° C are mixed with 695 g (5.4 moles) of dimethyldichlorosilane, 12 g of sulfuric acid (≅0.5% by weight) and, in order to produce hydrogen chloride, 3 g (0.167 mole) of water. The reaction mixture is stirred in an enamelled laboratory autoclave of 4 l capacity for 2 hours at 100° C. The colorless reaction product is freed from the dissolved hydrogen chloride in a water pump vacuum and is then heated at up to 55° C sump temperature and 0.6 mm Hg. 80 g of distillate (≅3.5% by weight) and 2,388 g of residue (product) having a chlorine content of 12.44% by weight are obtained.

EXAMPLE 12

257 g (1.72 moles) of methyltrichlorosilane, 11 g of sulfuric acid (≅0.5% by weight) and 4.5 g (0.25 mole) of water are added to 1,990 g (≅27 moles of $Me_2SiO$) of polydimethylsiloxane containing 1.15% by weight of SiOH and having a viscosity of 7 cp at 20° C. This reaction mixture is stirred for 2.5 hours in an enamelled laboratory autoclave of 4 l capacity at 100° C and 4 atmospheres gauge. The colorless reaction product is feed from the dissolved hydrogen chloride in a water pump vacuum and is then heated at up to 120° C sump temperature under 1 mm Hg. 242 g (≅13.5% by weight) of distillate containing 3.62% by weight of Cl and 1,910 g of residue (product 9 containing 5.93% by weight of Cl, are obtained.

EXAMPLE 13

48 g (0.37 mole) of dimethyldichlorosilane, 3.2 g (≅0.15% by weight) of perflurobutanesulfonic acid and 2.5 g (0.139 mole) of water are added to 2,110 g (≅28.7 moles of $Me_2SiO$) of polydimethylsiloxane containing 1.15% by weight of Si—OH and having a viscosity of 7 cp at 20° C. The reaction mixture is stirred for one hour in an enamelled laboratory autoclave of 4 l capacity at 100° C and 1 atmosphere gauge. The water-clear product is freed from the dissolved hydrogen chloride in a water pump vacuum and is then heated at up to 120° C sump temperature under 0.4 mm Hg. 180 g of distillate (≅9% by weight) and, 1,807 g of residue containing 0.45% by weight of Cl and having a viscosity of 605 cp at 20° C are obtained.

EXAMPLE 14

890 g (6.9 moles) of dimethyldichlorosilane, 10 g of perfluorobutanesulfonic acid (≅0.45% by weight) and 4 g (0.22 mole) of water are added to 1,440 g (19.5 moles of $Me_2SiO$) of polydimethoxysiloxane containing 1.15% by weight of SiOH and having a viscosity of 7 cp at 20° C. The reaction mixture is stirred in an enamelled laboratory autoclave of 4 l capacity for 1.5 hours at 100° C and 3.6 atmosheres gauge. The water-clear reaction product is freed from the dissolved hydrogen chloride in a water pump vacuum. Thereafter, 165 g of dimethyldichlorosilane are distilled off at 30° C sump temperature and 14 mm Hg. 2,110 g of residue (product) containing 16.3% by weight of Cl and having the following composition, determined by gas chromatography, remain: 4.5% of dimethyldichlorosilane, 8.25% of tetramethyldichlorodisiloxane, 17.25% of hexamethyldichlorotrisiloxane, 16.1% of octamethyldichlorotetrasiloxane, 12.00% of decamethyldichloropentasiloxane, 9.5% of dodecamethyldichlorohexasiloxane and 7.8% of quattuordecamethyldichloroheptasiloxane $ClSi(CH_3)_2$—$(OSi(CH_3)_2)_6Cl$ as well as a total of 19% of higher linear chlrosiloxanes.

EXAMPLE 15

1,340 g (10.4 moles) of dimethyldichlorosilane, 13 g ($\hat{=}0.6\%$ by weight) of perfluorobutanesulfonic acid and 4 g (0.22 mole) of water are added to 740 g ($\hat{=}10$ moles of $Me_2SiO$) of polydimethylsiloxane containing 1.15% by weight of SiOH and having a viscosity of 7 cp. The reaction mixture is stirred for 1.5 hours in an enamelled laboratory autoclave of 4 l capacity at 100° C and 3.7 atmospheres gauge. The colorless reaction product is freed from the dissolved hydrogen chloride in a water pump vacuum. According to analysis by gas chromatography, it contains 34.95% of dimethyldichlorosilane, 30.40% of tetramethyldichlorodisiloxane, 23.94% of hexamethyldichlorotrisiloxane, 7.75% of octamethyldichlorotetrasiloxane and 2.10% of decamethyldichloropentasiloxane.

EXAMPLE 16

377 g (2.3 moles) of chloromethylmethyldichlorosilane and 6.5 g ($\hat{=}0.5\%$ by weight) of perfluorobutanesulfonic acid are added to 1,080 g of a polysiloxane cntaining 100 mole, chloromethylmethylsiloxy units and 2.1% by weight of SiOH and having a viscosity of 78 cp at 20° C. The reaction mixture is stirred for 3 hours in an enamelled laboratory autoclave of 4 l capacity at 100° C and 3 atmospheres gauge. The colorless reaction product is freed from the dissolved hydrogen chloride in a water pump vacuum and is heated at up to 120° C sump temperature under 1 mm Hg. 36 g of distillate ($\hat{=}2.4\%$ by weight) and 1,282 g of residue (product), containing 7.13% by weight of inorganic (hydrolyzable) chlorine and 32.06% by weight of organically bound chlorine, are obtained.

EXAMPLE 17

107 g (0.83 mole) of dimethyldichlorosilane and 100 g ($\hat{=}4.5\%$ by weight) of Tonsil Standard bleaching earth are added to 2,150 g of polydimethylsiloxane ($\hat{=}29$ moles of $Me_2SiO$). The reaction mixture is stirred for 4 hours in an enamelled laboratory autoclave of 4 l capacity at 150° C and 4.5 atmospheres gauge. The reaction product is freed from the dissolved hydrogen chloride in a water pump vacuum, filtered to remove the bleaching earth and heated at up to 120° C sump temperature under 1 mm Hg. 128 g of distillate ($\hat{=}7.5\%$ by weight) and 1,634 g of residue, having a chlorine content of 2.28% by weight and a viscosity of 111 cp at 20° C, are obtained.

EXAMPLE 18

Hydrogen chloride is passed into 800 g of dimethylsiloxane with chlorine end groups, containing 0.45% by weight of Cl, and 800 g of dimethyl-siloxane, with chlorine end groups, containing 7.6% by weight of Cl, until saturation is reached. After adding 1.6 g ($\hat{=}0.1\%$ by weight) of perfluorobutanesulfonic acid, the reaction mixture is stirred for 1 hour at 100° C and 1 atmosphere gauge in an enamelled laboratory autoclave of 4 l capacity. The colorless reaction product is freed from the dissolved hydrogen chloride in a water pump vacuum and is then freed from low-molecular constituents by distillation at up to 120° C sump temperature under 1 mm Hg. 124 g ($\hat{=}8\%$ by weight) of distillate containing 4.14% by weight of Cl, and 1,386 g of residue (product) containing 3.77% by weight of Cl and having a viscosity of 23.2 cp at 20° C, are obtained.

EXAMPLE 19

270 g ($\hat{=}1.69$ moles) of $SiCl_4$ and 6.5 g ($\hat{=}0.2\%$ by weight) of perfluorobutanesulfonic acid are added to 2,780 g ($\hat{=}37.6$ moles of $Me_2SiO$) of polydimethylsiloxane containing 1.15% by weight of SiOH and having a viscosity of 7 cp at 20° C. The reaction mixture is stirred in an enamelled laboratory autoclave of 4 l capacity for 2 hours at 100° C and 2.4 atmospheres gauge. The colorless reaction product is freed from dissolved hydrogen chloride in vacuo and heated at up to 120° C/1 mm Hg. 137 g ($\hat{=}5\%$ by weight) of distillate, containing 4.72% by weight of Cl, and 2,702 g of residue (product), containing 5.57% by weight of Cl and having a viscosity of 37.3 cp at 20° C, are obtained.

EXAMPLE 20

10 g of polysiloxane containing 15.4 mmoles of SiH/g and having a chain length of 15 siloxy units, 71 g (0.55 mole) of dimethyldichlorosilane, 4.5 g (0.25 mole) of water and 1.2 g ($\hat{=}0.1\%$ by weight) of perfluorobutanesulfonic acid are added to 500 g ($\hat{=}6.75$ moles as $Me_2SiO$) of polydimethylsiloxane containing 1.15% by weight of SiOH and having a viscosity of 7 cp at 20. The reaction mixture is stirred for 1 hour at about 80° C and 2.4 atmospheres gauge in an enamelled laboratory autoclave of 4 l capacity. The dissolved hydrogen chloride is removed in vacuo and the product is freed from low-molecular constituents by distillation at up to 120° C sump temperature under 1 mm Hg. 30 g ($\hat{=}$ 6% by weight) of distillate containing 2.01% by weight of Cl, and 481 g of residue (product) containing 2.88% by weight of Cl and 0.27 mmoles of Si—H/g and having a viscosity of 29.4 cp at 20° C, are obtained.

EXAMPLE 21

160 g (1.24 moles) of dimethyldichlorosilane, 9 g ($\hat{=}$ 0.5% by weight) of phosphoric acid and 4.5 g (0.25 mole) of water are added to 1,815 (= 6 moles) of octamethylcyclotetrasiloxane. The reaction mixture is stirred in an enamelled laboratory autoclave of 4 l capacity for 2 hours at 100° and 2.6 atmospheres gauge. After removing the dissolved hydrogen chloride in vacuo, readily volatile constituents are removed by distillation at up to 120° sump temperature under 1 mm Hg. 148 g ($\hat{=}$ 8% by weight) of distillate containing 2.64% by weight of Cl, and 1,698 g of residue (product) containing 3.38% by weight of Cl and having a viscosity of 33.4 cp at 20° C, are obtained.

EXAMPLE 22

129 g (1 mole) of dimethyldichlorosilane, 5 g ( $\hat{=}$ 0.25% by weight) of phosphorus pentoxide and 4.5 g (0.25 mole) of water are added to 2,180 g ($\hat{=}$ 29.5 moles of Me$_2$SiO) of polydimethylsiloxane containing 1.15% by weight of SiOH and having a viscosity of 7 cp at 20° C. The reaction mixture is stirred in a laboratory autoclave of 4 l capacity for 2 hours at 100° and 2.4 atmospheres gauge. The dissolved hydrogen chloride is removed in vacuo and the reaction product is freed from readily volatile constituents by distillation at up to 120° C under 1 mm Hg. 171 g ($\doteq$ 8% by weight) of distillate containing 0.41% by weight of Cl, and 2,013 g of residue (product) containing 1.54% by weight of Cl and having a viscosity of 100 cp at 20° C, are obtained.

EXAMPLE 23

1,815 g ($\doteq$ 24.5 moles of Me$_2$SiO) of polydimethylsiloxane containing 1.15% by weight of SiOH and having a viscosity of 7 cp at 20° C are mixed with 201 g (1.56 moles) of dimethyldichlorosilane, 10 g ($\doteq$ 0.5% by weight) of 1-chloro-1-oxophospholine and 4.5 g (0.25 mole) of water. The reaction mixture is stirred for 2 hours at 100° C and 3.4 atmospheres gauge in an enamelled laboratory autoclave of 4 l capacity. After removing the dissolved hydrogen chloride in vacuo, the reaction product is heated at up to 60° C sump temperature under 1 mm Hg. 146 g ($\doteq$ 8% by weight) containing 3.94% by weight of Cl, and 1,698 g of residue (product) containing 3.59% by weight of Cl and having a viscosity of 21.9 cp at 20° C, are obtained.

It will be appreciated that the instant specification and examples are set forth by way of illustration and not limitation, and that various modifications and changes may be made without departing from the spirit and scope of the present invention.

What is claimed is:

1. A process for the preparation of chlorine-substituted siloxanes comprising reacting at least one chlorosilane of the formula $$R_a R_b' SiCl_{(4-a-b)}$$

or a partial hydrolysis product thereof, with at least one siloxane having structural units selected from the group consisting of

[R$_2$R″SiO$_{1/2}$], [RR″SiO], [R″SiO$_{3/2}$] and [SiO$_2$]

wherein
$a = 0, 1, 2$ or 3,
$b = 0, 1, 2$ or 3,
$a + b \leq 3$,

R and R' each independently is hydrogen or an aliphatic, aromatic, araliphatic, saturated or unsaturated, optionally halogen-substituted or cyano-substituted, monovalent hydrocarbon radical with up to 18 C atoms, R″ is chlorine or hydroxyl or has the meaning indicated for R and R', at least one of R, R', and R″ being an organo group, and the number of Si—Cl groups exceeds the number of all Si—OH groups, the reaction being carried out at about −10° to 200° C in the presence of about 0.1 to 3% by weight of the reaction mixture of each of (i) at least one protonic acid equilibration catalyst for siloxanes and (ii) a hydrogen halide acid.

2. The process according to claim 1 wherein the protonic acid equilibration catalyst comprises at least one member selected from the group consisting of sulfuric acid, oleum, a polysulfuric acid, a sulfonic acid and a polysulfonic acid.

3. The process according to claim 1 wherein the protonic acid equilibration catalyst comprises a perfluoroalkanesulfonic acid of the formula $$R_F SO_3 H$$

wherein
R$_F$ is a perfluorinated alkyl radical with up to 10 C atoms.

4. The process according to claim 1 wherein the protonic acid equilibration catalyst comprises an alkanesulfonic acid of the formula $$R_A SO_3 H$$

wherein
R$_A$ is an alkyl or aryl radical with up to 18 C atoms.

5. The process according to claim 1, wherein the hydrogen halide acid is produced in situ.

6. The process according to claim 2, wherein the hydrogen halide acid is produced in situ, the reaction is effected under an excess pressure of about 0.5 to 6 atmospheres, and the reaction mass is subsequently heated with removal of hydrogen halide.

* * * * *